United States Patent
Tamminen et al.

(10) Patent No.: US 9,021,876 B2
(45) Date of Patent: May 5, 2015

(54) METHOD AND APPARATUS FOR DETERMINING CHANGE IN MASS OF FAN IMPELLER

(75) Inventors: Jussi Tamminen, Lappeenranta (FI); Tero Ahonen, Lappeenranta (FI); Jero Ahola, Lappeenranta (FI); Markku Niemelä, Laapeenranta (FI)

(73) Assignee: ABB Oy, Helsinki (FI)

( * ) Notice: Subject to any disclaimer, the term of this patent is extended or adjusted under 35 U.S.C. 154(b) by 218 days.

(21) Appl. No.: 13/590,708

(22) Filed: Aug. 21, 2012

(65) Prior Publication Data
US 2013/0047724 A1 Feb. 28, 2013

(30) Foreign Application Priority Data
Aug. 29, 2011 (EP) .................................... 11179147

(51) Int. Cl.
F04D 27/00 (2006.01)
F04D 25/06 (2006.01)
F04D 25/08 (2006.01)
H02P 23/14 (2006.01)
F04D 29/70 (2006.01)
H02P 21/14 (2006.01)

(52) U.S. Cl.
CPC .............. F04D 27/001 (2013.01); F04D 25/08 (2013.01); F04D 25/06 (2013.01); F04D 29/703 (2013.01); H02P 21/143 (2013.01); H02P 23/14 (2013.01)

(58) Field of Classification Search
CPC ....... F04D 25/06; F04D 25/08; F04D 27/001; F04D 29/703; H02P 21/143; H02P 23/14
USPC ................. 73/168, 503, 865; 416/61; 417/63; 702/175, 191, FOR. 164, FOR. 166
See application file for complete search history.

(56) References Cited

U.S. PATENT DOCUMENTS

| | | | |
|---|---|---|---|
| 4,427,339 A * | 1/1984 | Witzel | 416/131 |
| 5,175,483 A | 12/1992 | Fujii et al. | |
| 2001/0025524 A1 * | 10/2001 | Ishiwari et al. | 73/865 X |
| 2004/0100219 A1 | 5/2004 | Kerner et al. | |

FOREIGN PATENT DOCUMENTS

| | | | |
|---|---|---|---|
| DE | 102009022720 A1 * | 12/2010 | F04D 25/06 |
| EP | 0476588 A1 | 3/1992 | |

(Continued)

OTHER PUBLICATIONS

DERWENT-ACC-No. 2002-718636, Derwent-Week: 200278, Copyright ©2014 Thomson Reuters, Derwent abstract of JP 2002-267249 A, JP document was dated Sep. 18, 2002.*

JPO machine translation of JP 2002-267249 A, downloaded from http://www4.ipdl.inpit.go.jp/cgi-bin/tran_web_cgi_ejje?atw_u=http . . . on Aug. 15, 2014, JP document was dated Sep. 18, 2002.*

InElectronics Engineering, What is the Difference between frequency converter and frequency inverter?, 1st page, downloaded JPO machine translation of JP 2002-267249 A, downloaded from http://www4.ipdl.inpit.go.jp/cgi-bin/tran_web_cgi_ejje?atw_u=http . . . on Aug. 15, 2014, JP document was dated Sep. 18, 2002.*

(Continued)

*Primary Examiner* — Thomas P Noland
(74) *Attorney, Agent, or Firm* — Buchanan Ingersoll & Rooney PC

(57) ABSTRACT

A method for determining a change in a mass of a fan impeller. The method includes inducing a torque to the fan impeller and determining a change in the angular speed of the fan impeller, induced by the torque. A value for a first parameter representing a present mass of the fan impeller is determined on the basis of the change in the angular speed and the torque. The change in the mass is then determined on the basis of the first parameter and a second parameter representing the reference mass of the fan impeller.

20 Claims, 2 Drawing Sheets

(56) References Cited

FOREIGN PATENT DOCUMENTS

| EP | 1388732 | A1 | | 2/2004 | | |
|---|---|---|---|---|---|---|
| EP | 2135660 | A1 | | 12/2009 | | |
| JP | 2002-267249 | A | | 9/2002 | | |
| JP | 2011058501 | A | * | 3/2011 | .............. | F04D 27/00 |
| SU | 488143 | A | * | 5/1976 | .............. | G01P 15/08 |
| SU | 1059466 | A | * | 12/1983 | .............. | G01M 7/00 |

OTHER PUBLICATIONS

InElectronics Engineering, What is the Difference between frequency converter and frequency inverter?, 1st page, downloaded from http://www.answers.com/topic/frequency-converter on Aug. 15, 2014.*

Extended European Search Report dated Feb. 10, 2012, for European Application No. 11179147.1., 7 pages.

* cited by examiner

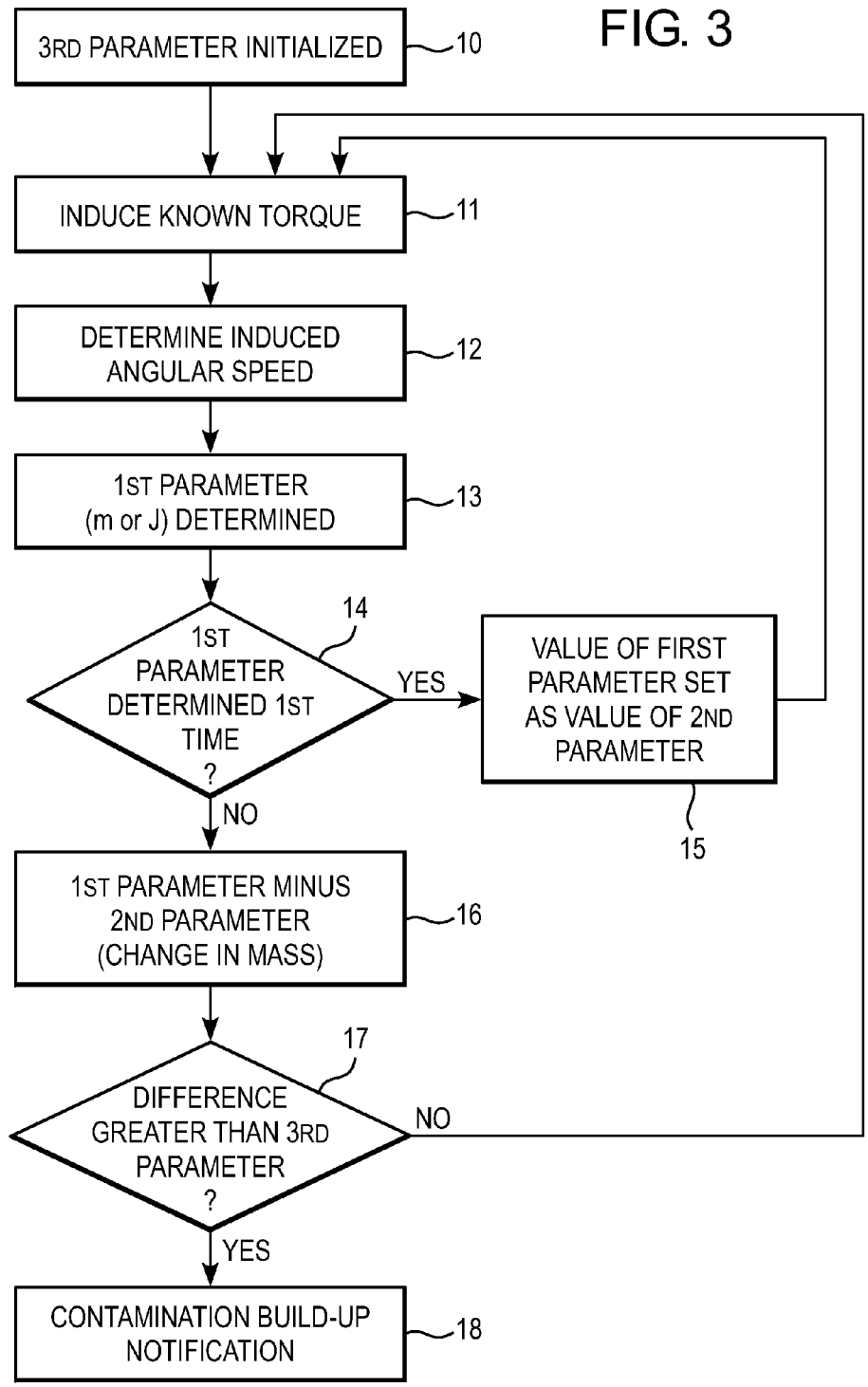

METHOD AND APPARATUS FOR DETERMINING CHANGE IN MASS OF FAN IMPELLER

RELATED APPLICATION(S)

This application claims priority under 35 U.S.C. §119 to European Patent Application No. 11179147.1 filed in Europe on Aug. 29, 2011, the entire content of which is hereby incorporated by reference in its entirety.

FIELD

The present disclosure relates to a fan, and for example, to detecting a change in the mass of a fan impeller.

BACKGROUND

Fans are used in a large variety of applications and operating conditions. For example, fans can be used for ventilating contaminated air and exhaust of combustion gases. In these applications, small particles, such as soot, may accumulate on the fan impeller and gradually cause a decrease in the efficiency of the fan.

Contamination of the fan impeller can be seen as a cause for some fan system failures. The mass of the impeller increases as foreign particles get stuck on the fan impeller. Because of vibration or careless maintenance, part of the additional mass may fall off, causing unbalance in the fan impeller. If the unbalance is not detected and corrected early enough, a fan failure may occur because of the higher vibration. Such a failure may lead to production losses or even to hazards to personnel. Thus, it may be desirable to detect contamination build-ups.

Contamination build-ups in fan impellers are visually detected or, if the contamination causes imbalance in the impeller, by vibration measurements. However, these methods include additional instrumentation or visual and/or manual inspection of the fan. Thus, they increase the operating cost of the application comprising fan impellers.

SUMMARY

In accordance with an aspect, a method for determining a change in a mass of a fan impeller is disclosed, which includes inducing a torque to the fan impeller; determining a change in an angular speed of the fan impeller, induced by the torque; determining, on a basis of the change in the angular speed and the torque, a value for a first parameter representing a present mass of the fan impeller; and determining the change in the mass on the basis of the first parameter and a second parameter representing a reference mass of the fan impeller.

In accordance with another aspect, an apparatus for determining a change in a mass of a fan impeller is disclosed, which includes a frequency converter for inducing a torque to a fan impeller, and for determining a change in an angular speed of the fan impeller, induced by the torque; an estimator for determining, on the basis of a change in the angular speed and the torque, a value for a first parameter representing a present mass of the fan impeller; and a watchdog for determining a change in the mass on the basis of the first parameter and a second parameter representing a reference mass of the fan impeller.

In accordance with a further aspect, an apparatus for determining a change in a mass of a fan impeller is disclosed, which includes means for inducing a torque to the fan impeller; means for determining a change in the angular speed of the fan impeller, induced by the torque; means for determining, on the basis of the change in the angular speed and the torque, a value for a first parameter representing a present mass of the fan impeller; and means for determining the change in the mass on the basis of the first parameter and a second parameter representing a reference mass of the fan impeller.

BRIEF DESCRIPTION OF THE DRAWINGS

Exemplary embodiments will be described in detail with respect to the drawings, wherein:

FIG. 3 illustrates an exemplary flow chart for the operation of the apparatus of FIG. 2.

DETAILED DESCRIPTION

Figure 1:
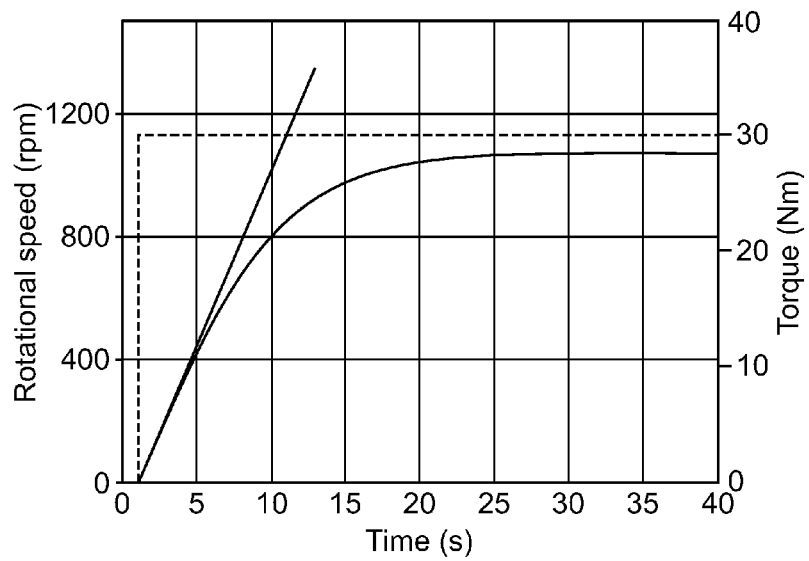
FIG. 1 illustrates an example of a change in angular speed in response to an applied stepwise torque.

In accordance with an aspect of the present disclosure, a change in the mass of a fan impeller can be detected by using a method which is based on the idea that the moment of inertia of the fan increases as contaminants increase the mass of the fan impeller. The moment of inertia is inversely proportional to the derivate of the angular speed of the fan impeller as a function of time when a torque is applied to the fan. As the moment of inertia of the fan increases, the derivate of the angular speed of the fan decreases.

A fluid transferred by the fan may have an effect on the measurement. Thus, to avoid the effect of the fluid transferred to the measurement, the derivate may be determined by using a low angular speed range where the torque used by the moment of inertia of the fan is much greater than the torque used to transfer the fluid.

A frequency converter may be utilized in detecting the build-up of additional mass. By using a frequency converter powering the fan, it is possible to detect a build-up of a contaminant or contaminants without extra instrumentation also when the fan is otherwise operating in a normal and healthy state.

A relationship between a torque T, a moment of inertia J, and an angular speed $\omega$ can be represented in the following form:

$$T = J\frac{d\omega}{dt} \qquad (1)$$

The mass of a fan impeller can be estimated using Equation 1, if the torque T and the time derivate of an angular speed induced by the torque are known.

For example, a known torque T may first be induced to the fan impeller. The torque T may be induced on the basis of a set torque reference pattern. A change in an angular speed $\omega$ of the fan impeller induced by the torque may then be determined, for example, by measuring. The change may, for example, be represented in a form of time derivate of the angular speed $\omega$. The change of the angular speed may, for example, be calculated on the basis of a measured angular speed $\omega$. Alternatively, the time derivate of the angular speed can be determined, for example, by directly measuring an acceleration induced by the torque.

A moment of inertia J can be determined on the basis of the torque T and the change in the angular speed $\omega$. Because a moment of inertia is proportional to a mass, the mass of the fan impeller may be represented in the form of the moment of inertia J.

Equation 1 may be used to determine a change in the mass caused by, for example, a contaminant accumulating on a fan impeller. A value for a first parameter representing the present mass of the fan impeller may be determined on the basis of the torque and the change in the angular speed. The torque may be measured or estimated. A torque reference of a controller producing the torque can also be used to represent an estimate of the torque. The change in the mass may then be determined on the basis of the first parameter and a second parameter representing a reference mass of the fan impeller.

The value of the first parameter may be sequentially updated and compared to a set value of the second parameter. For example, the second parameter may be used to indicate a maximum limit for the mass of the fan impeller. If the value of the first parameter exceeds the second parameter, a notification may be issued.

Alternatively, a first value of the first parameter determined after a fan has been installed or cleaned may be used as a reference value with which first parameter values are later on compared. The first value of the first parameter may be set as the value of the second parameter. The first parameter may then be sequentially updated, and the difference between the values of the first parameter and the second parameter may be calculated. A value for a third parameter representing a maximum allowable change in the mass can be set.

A change in the mass determined on the basis of the first parameter and the second parameter may then be compared with the third parameter, and if the change in the mass exceeds the third parameter, a notification may be issued.

The change in the mass may, in some aspects of the disclosed method, be represented in the form of a change ($\Delta J$) in the moment of inertia. The first parameter and the second parameter are represented in the form of a moment of inertia J.

The first parameter, the second parameter, and the third parameter may also be represented directly by a mass. For example, a change ($\Delta m$) in the mass that has affected the moment of inertia can be calculated in weight units. For example, if a contaminant on the fan impeller is assumed to accumulate at a certain distance r from the axis of rotation, the change ($\Delta m$) in mass can be estimated as follows:

$$\Delta m = \frac{\Delta J}{r^2}, \tag{2}$$

where $\Delta J$ is a change in the moment of inertia.

If a distribution of a contaminant on the fan impeller can be predicted, a similar method can be used to estimate a change $\Delta m$ in the mass caused by the contaminant. The total moment of inertia can be seen as an arithmetic sum of individual moments of inertia. When the distribution of these individual moments of inertia is known, the change $\Delta m$ in the mass can be estimated.

In an aspect of the disclosed method, a torque T with a step pattern may be used in order to determine the time derivate of the angular speed $\omega$. The torque T is induced to the fan impeller by using a constant torque reference. When the torque T has a step-like pattern in a time-domain, the angular speed $\omega$ can be written as a function of time in the following form:

$$\omega(t) = \frac{T}{J}t + \omega_0, \tag{3}$$

where t is time, $\omega_0$ is the initial angular speed, and J is a moment of inertia. It can be seen from Equations 1 and 3 that when only the moment of inertia J is considered, a derivate k (=T/J) of the angular speed $\omega$ depends on the applied torque T and the moment of inertia J. The derivate k stays constant in the time-domain and is inversely proportional to the moment of inertia J.

The total moment of inertia is arithmetic sum of individual moments of inertia. Thus, if two separate measurements of k have been made, the change in the moment of inertia can be calculated by:

$$\Delta J = \frac{T_2}{k_2} - \frac{T_1}{k_1}, \tag{4}$$

where $T_1$ and $T_2$ are torque steps used for the measurement of $k_1$ and $k_2$, respectively.

When not taking into account the effect of a transferred fluid, a moment of inertia $J_{fan}$ of a fan can be seen as a sum of two components: an initial moment of inertia $J_{impeller}$ a clean fan impeller and moment of inertia $J_{contaminants}$ caused -impeller of by a contaminant or contaminants on the fan blades:

$$J_{fan} = J_{impeller} + J_{contaminants} \tag{5}$$

However, a fluid transferred through the fan may have a significant effect on the moment of inertia. At higher angular speeds, a total torque specification for achieving a certain angular speed may be dominated by the torque used to transfer the fluid. The torque specification for transferring the fluid may have an effect on the time derivate of the angular speed while the moment of inertia of the fan stays constant. In some aspects, a linear increase according to Equation 3 may be only detectable at low angular speeds where the total torque specification is dominated by the moment of inertia $J_{impeller}$ of the fan impeller.

FIG. 1 illustrates an example of a change in the angular speed in response to an applied stepwise torque. In FIG. 1, a combined effect of a moment of inertia of a fan and the torque specification for a fluid transferred at the angular speed is shown. The angular speed increases substantially linearly to an exemplary speed of 400 rpm. At higher speeds, the torque used to transfer the fluid can become more dominant, and the rate of change of the angular speed is no longer linear.

In order to minimize the effect of the torque specification for the fluid transfer from the analysis, an upper limit for an angular speed range used in the estimation may, for example, be defined such that 90% to 95% of the total torque specification is caused by the moment of inertia of the fan impeller. An approximation of a ratio $R_T$ between the torque specified by the moment of inertia of the fan and the torque involved for transferring the fluid can be calculated for example as follows:

$$R_T = 1 - \left(\frac{n}{n_{final}}\right)^2, \tag{6}$$

where n is an instantaneous angular speed and $n_{final}$ is a final angular speed acquired by a constant torque used. On the basis of Equation 6, the upper angular speed limit $n_{limit,upper}$ may be calculated as follows:

$$n_{limit,upper} = \sqrt{1-R_T} n_{final} \tag{7}$$

Correspondingly, there may be a lower limit for the angular speed used in the analysis because angular speed estimates provided, for example, by a frequency converter without a speed sensor on the motor shaft may be erroneous at a speed near to zero. At near to zero speeds, static friction may cause non-linearity in the derivate of the angular speed. For these reasons, the lower limit may, for example, be defined such that angular speeds of 3% or less of the final speed are excluded from the estimation. In this manner, unwanted physical phenomena and erroneous speed estimates may be minimized in the analysis. Since a required lower limit can be affected by the angular speed method used in the frequency converter, a scalar controlled frequency may, for example, require a higher value than 3% of the final speed for the lower limit.

For an exemplary fan arrangement having a final angular speed of 1500 rpm, an upper angular speed limit of 335 rpm can be calculated using Equation 6 with a 95% criterion for $R_T$. The upper limit is an angular speed on which 95% of a total torque specification is caused by the moment of inertia. A lower limit of 45 rpm may be calculated on the basis of the criterion of 3% of the final angular speed (1500 rpm) of the fan impeller reached by using a constant torque.

In the previous aspect, a step pattern was used for the torque reference in order to achieve a constant time derivate of the angular speed in a certain angular speed region. However, other patterns for the torque may also be used. For example, Equation 1 can be modified to the form:

$$J = \frac{\int_{t_0}^{t_1} T dt}{\omega(t_1) - \omega(t_0)}, \quad (8)$$

where $t_0$ and $t_1$ indicate instants of starting and ending an estimation sequence, respectively. By calculating a time integral of the torque and dividing the integral by a change in the angular speed during the estimation sequence, an estimate of the moment of inertia can be calculated. In some aspects, a pre-calculated value may be used instead of calculating the time integral of the torque each time.

Figure 2:
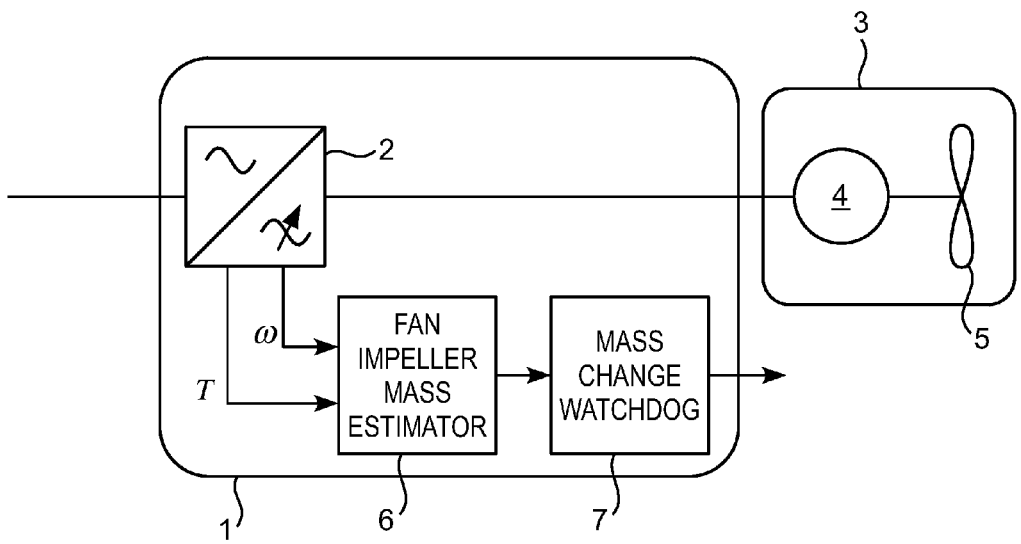
FIG. 2 illustrates an exemplary apparatus for estimating a change in the mass of a fan impeller.

FIG. 2 illustrates an exemplary apparatus 1 for estimating a change in the mass of a fan impeller. The apparatus comprises a frequency converter 2 powering a fan 3. The frequency converter 2 supplies power to a fan motor 4 of the fan 3. The fan motor 4 rotates a fan impeller 5. The frequency converter 2 acts as a means for inducing a torque to the fan impeller 5. A torque applied to the fan impeller 5 causes a change in the angular speed of the fan impeller 5. In FIG. 2, the frequency converter 2 can be used for determining the angular speed. The frequency converter 2 may, for example, estimate the angular speed on the basis of fan motor currents.

In FIG. 2, the apparatus 1 comprises an estimator 6, which produces a value representing the mass of the fan impeller 5. The estimator 6 determines a change in the angular speed of the fan impeller induced by the torque by using the angular speed information provided by the frequency converter 2. The estimator 6 then calculates a value for a first parameter representing the present mass of the fan impeller on the basis of a change in the angular speed of the fan impeller and the torque.

The apparatus 1 also includes a watchdog 7, which determines the change in the mass on the basis of the first parameter and a second parameter representing a reference mass of the fan impeller. The watchdog 7 may include a comparator, which compares the difference between the first parameter and the second parameter to a third parameter representing a maximum allowable change in mass. The watchdog may further include a means for sending a warning message to the user in case the change in the mass exceeds the maximum allowable change in the mass. The estimator 6 and the watchdog 7 may, for example, be implemented as a part of the frequency converter 2.

In FIG. 2, the frequency converter 2 provides the torque and the angular speed information for the estimator 6. However, the torque and the angular speed information may also be provided by other means. For example, the fan 3 may include an angular speed sensor. In some aspects, the torque between the fan motor and the fan impeller may also be directly measured by a torque sensor. Depending on the implementation, a mass of the fan motor may be included to the mass estimate of the fan impeller.

The operation of the apparatus 1 may be divided into two sequences.

First, a reference sequence for determining a reference may be executed. A value for the second parameter may be set during this sequence. A value for a third parameter representing a maximum allowable change in the mass may also be set. The reference sequence may, for example, take place during commissioning or after a fan impeller clean-up. A first value of the first parameter determined after a fan has been installed or cleaned may be used as the value of the second parameter. The first parameter representing the present mass of the fan impeller can be determined using the method disclosed above.

Second, a detection sequence is initiated. A change in the mass may be determined on the basis of a torque induced to the fan impeller and a change in the angular speed of the fan impeller induced by the torque as disclosed above.

The difference between the values of the first parameter and the value of the second parameter may be calculated. The difference represents a change in the mass of the fan impeller. The difference may then be compared with the third parameter, and if the difference exceeds the third parameter, a notification may be issued.

Alternatively, the first parameter may be compared with the second parameter indicating a maximum limit for the mass of the fan impeller, and, if the first parameter exceeds the second parameter, a notification may be issued.

FIG. 3 illustrates a flow chart for the operation of the apparatus of FIG. 2. The reference sequence and the detection sequence share some of the steps in FIG. 3.

In the reference sequence, the third parameter is first initialized in step 10. The third parameter may, for example, be set to have a certain maximum change in the mass, represented in weight units. The maximum change in the mass may also be represented in the form of a percentage of the reference mass.

The reference sequence continues by determining the present mass of the fan impeller 6 in steps 11, 12, and 13.

A known torque is induced to the fan impeller on the basis of a set torque reference pattern in step 11. In FIG. 3, the pattern is a step pattern. The fan is accelerated from a zero angular speed by using a constant torque reference.

The angular speed of the fan impeller induced by the torque is then determined in step 12. The frequency converter may provide an angular speed estimate or the angular speed may be measured using a sensor. The angular speed may be sequentially sampled during the acceleration and the samples may be stored, for example, in a memory of the apparatus, or, if the apparatus is a part of a frequency converter, in a memory of the frequency converter.

In step 13, the value of the first parameter representing the present mass is determined. A time derivate of the angular speed may be calculated on the basis of the angular speed. After collecting enough angular speed samples, the samples may be filtered in order to remove possible noise and clearly erroneous samples. The filtering may, for example, be implemented using a 20-point median filter having a time period of 0.2 seconds. A new data set where the angular speed is between a lower limit and an upper limit may be formed out of the filtered samples. A slope k representing the time derivate of the angular speed can then be calculated from the data set by using, for example, the method of the sum of least squares.

Next, the value for the first parameter may be determined on the basis of the slope k. Since the torque follows a known step pattern, the value of the slope k may itself be used as an indicator of the mass of the fan impeller. The first and second parameter may be represented in the form of the time derivate of the angular speed. Slope k is inversely proportional to the contamination build-up. As the amount of a contaminant starts to build up, the value of k decreases.

Alternatively, the moment of inertia J or a mass m can be calculated. A change in the moment of inertia and a change in the mass are directly proportional to the contamination build-up. As the amount of the contaminant build up, their values increase.

The disclosed method may also be used to detect a decrease in the mass of the fan impeller. In some applications, a contaminant may grind the fan impeller, causing the mass of the fan impeller to decrease. This can be seen as a reduction in the moment of inertia of the fan impeller. A loss in the mass may be seen as an increase in the value of the slope k, or as a decrease in the values of the moment of inertia J or the mass m.

Next, a choice is made in step 14. If the value of the first parameter is calculated for the first time, for example, after a fan has been installed or cleaned, the value is set as the value of the second parameter in step 15. The reference sequence is now finished and the detection sequence begins.

The detection sequence starts back from step 11, and continues again to step 14. As the value of the first parameter is not calculated for the first time, step 16 is executed after the selection step 15. In step 16, the difference between the first parameter representing the present mass of the fan impeller and the second parameter representing the reference mass of the fan impeller is calculated. In the following step 17, a further choice is made.

If this difference exceeds the value of the third parameter set in step 10, a notification is issued in step 18. The watchdog of the apparatus may, for example, send a warning message to the user that there is a contamination build-up in the fan, which causes the change in the mass of the fan impeller to exceed its maximum allowable limit.

If the difference does not exceed the value of the third parameter in step 17, the detection sequence is repeated from step 11.

Laboratory measurements were conducted for an arrangement comprising a radial fan system comprising a Fläkt-Woods Centripal EU 4 MD 630 radial blower, an ABB induction motor and an ABB ACS M1 frequency converter. The nominal values of the system were as follows:

TABLE 1

| Fan | | | | | Motor | | | | Frequency converter Nominal current (A) |
|---|---|---|---|---|---|---|---|---|---|
| Rotational speed (rpm) | Power (kW) | Flow rate (m³/s) | Fan total pressure (Pa) | Impeller diameter (mm) | Rotational speed (rpm) | Power (kW) | Current (A) | cosφ | |
| 1446 | 7.50 | 2.90 | 1190 | 630 | 1450 | 7.5 | 15.7 | 0.80 | 16 |

An increase of the mass was simulated by adding weights to the outer edge of the fan impeller. Two identical weights were fastened on opposite sides of the fan impeller in order to ensure balance of the fan impeller.

The exemplary mass increases were 0 g, 50 g, 104 g and 151 g. The exemplary moments of inertia caused by the added masses were 0 kgm², 0.005 kgm², 0.010 kgm², and 0.015 kgm², respectively. The exemplary inertia of the fan impeller used was 1.26 kgm² according to the manufacturer. Thus, exemplary increases of the moment of inertia of the fan impeller were 0%, 0.4%, 0.8%, and 1.2%, respectively. The tests were done using different valve positions and torque reference values.

In the first measurement setup, a 30% torque reference (14.8 N) was used at the start-up. $R_T$ was set to 95%. Measurements were conducted using three different valve positions, so the fan was operating at 50%, 100%, and 120% of the nominal flow rate.

The results are shown in Table 2. Each of the three measurements was repeated three times in order to ensure repeatability of the results. Each row shows the mean and standard deviation of the nine measurements. Change magnitudes Δk and ΔJ were calculated using more accurate values of the mean values of k than what is shown in Table 2. $k_{0g}$ represents the reference slope and $J_{0g}$ represents the reference moment of inertia in Table 2.

TABLE 2

| Mass increase (g) | Mean of k | Standard deviation of k | Indicated change in the mean of k ($|\Delta k| = |k - k_{0g}|$) | Indicated change in k ($\Delta k/k_{0g}$) | Indicated change in the moment of inertia ($\Delta j/j_{0g}$) |
|---|---|---|---|---|---|
| 0 | 115.4 | 0.15 | 0 | 0.00% | 0.00% |
| 50 | 115.0 | 0.17 | 0.4 | −0.40% | 0.41% |
| 104 | 114.5 | 0.10 | 0.9 | −0.80% | 0.81% |
| 151 | 114.1 | 0.16 | 1.4 | −1.16% | 1.17% |

The results in Table 2 indicate that a change in the valve position had no significant effect on the estimation of the moment of inertia. The standard deviation remained small compared to the mean value of k. The estimated change in the moment of inertia also remains accurate despite a change in a fan valve operating point.

In another measurement setup, a 50% torque reference (24.7 Nm) was used. Measurements were conducted using two valve positions. The results shown in Table 3 also indicate that the valve position had no significant effect on the estimation accuracy. Change magnitudes Δk and ΔJ were calculated using more accurate values of the mean values of k than what is shown in Table 3.

TABLE 3

| Mass increase (g) | Mean of k | Standard deviation of k | Indicated change in the mean of k ($|\Delta k| = |k - k_{0g}|$) | Indicated change in k ($\Delta k/k_{0g}$) | Indicated change in the moment of inertia ($\Delta j/j_{0g}$) |
|---|---|---|---|---|---|
| 0 | 190.5 | 0.16 | 0 | 0.00% | 0.00% |
| 50 | 189.4 | 0.29 | 1.1 | −0.57% | 0.58% |
| 104 | 189.0 | 0.27 | 1.5 | −0.80% | 0.81% |
| 151 | 188.2 | 0.32 | 2.3 | −1.19% | 1.20% |

The results shown in Table 2 and Table 3 indicate that an increase in the mass of a fan impeller can be detected by using the disclosed method since the mean value of k clearly indicates a notable change in the moment of the inertia of the fan impeller. In addition, the standard deviation of the measurement is smaller than the change of k, which suggests that the results are repeatable.

The results also indicate that the torque reference used for the acceleration of the fan impeller did not have a significant effect on the analysis results for indicating a change ($\Delta J/J_{0g}$) in the moment of inertia. Thus, the torque reference is not constrained to a certain level when using the disclosed method.

Further, the results seem to indicate that the estimation of the change in the moment of inertia may be maximized by using the same torque reference for the reference sequence and the detection sequence. The effect of the fan operating point may be minimized by using the same upper and lower angular speed limits in the reference sequence and the detection sequence.

In the laboratory measurements, a change in the mass was also estimated using Equation 2. The fan impeller had a diameter d of 630 mm. In the estimation, the contaminants (the added weights) were assumed to be accumulated on the edges of the fan blades, thus giving a radius r of approximately half (315 mm) of the fan impeller diameter d. The results of the estimation of the mass increase are shown in Table 4.

TABLE 4

| Torque reference 30% | | | Torque reference 50% | | |
|---|---|---|---|---|---|
| Mass increase (g) | Estimated mass increase (g) | Estimation error (g) | Mass increase (g) | Estimated mass increase (g) | Estimation error (g) |
| 0 | 0 | 0 | 0 | 0 | 0 |
| 50 | 50 | 0 | 50 | 72 | 12 |
| 104 | 100 | −4 | 104 | 101 | −3 |
| 151 | 144 | −7 | 151 | 150 | −1 |

The estimation of the increase in the mass was quite accurate, as shown in Table 4. The relatively accurate result may, in part, be a consequence of the assumption that all of the mass is at a certain distance from the axis of rotation. In real applications, the situation may not be as simple.

However, if a distribution of accumulating contaminants is well known, it may be possible to achieve results of similar accuracy.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for determining a change in a mass of a fan impeller comprising:
   inducing a torque to the fan impeller on the basis of a set torque reference pattern;
   determining a change in an angular speed of the fan impeller, induced by the torque;
   determining, on a basis of the change in the angular speed and the torque, a value for a first parameter representing a present mass of the fan impeller; and
   determining the change in the mass on the basis of the first parameter and a second parameter representing a reference mass of the fan impeller.

2. The method of claim 1, comprising:
   setting a value for the second parameter;
   setting a value for a third parameter representing a maximum allowable change in the mass;
   comparing the change in the mass with the third parameter; and
   if the change in the mass exceeds the third parameter, issuing a notification.

3. The method of claim 2, wherein issuing the notification comprises:
   sending a warning signal that the change in the mass of the fan impeller has exceeded its maximum allowable limit.

4. The method of claim 1, wherein and the change in the angular speed is represented as a time derivate of the angular speed.

5. The method of claim 4, wherein determining the time derivate of the angular speed comprises:
   determining the angular speed of the fan impeller induced by the torque; and
   calculating a time derivate of the angular speed on the basis of the angular speed.

6. The method according to claim 5, wherein determining the angular speed comprises:
   sequentially sampling the angular speed and storing angular speed samples; and
   filtering the angular speed samples in order to reduce noise and to remove clearly erroneous values.

7. The method of claim 4, wherein calculating the time derivate of the angular speed comprises:
   forming a new data set out of the filtered samples, wherein the angular speed is between a lower limit and an upper limit; and
   calculating the time derivate from the new data set by using a method of the sum of least squares.

8. The method of claim 7, wherein the upper limit is an angular speed on which approximately 95% of a total torque specification is caused by a moment of inertia of the fan impeller, and the lower limit is approximately 3% of a final angular speed of the fan impeller reached by using a constant torque.

9. The method of claim 1, wherein the torque is induced to the fan impeller by using a constant torque reference.

10. The method of claim 1, wherein the first parameter and second parameter are represented as moments of inertia.

11. The method of claim 1, wherein the first parameter and the second parameter are represented as time derivates of the angular speed.

12. The method of claim 1, wherein the first parameter and the second parameter are represented by a mass.

13. An apparatus for determining a change in a mass of a fan impeller, comprising:
- a frequency converter for inducing a torque to a fan impeller on the basis of a set torque reference pattern, and for determining a change in an angular speed of the fan impeller, induced by the torque;
- an estimator for determining, on the basis of a change in the angular speed and the torque, a value for a first parameter representing a present mass of the fan impeller; and
- a watchdog for determining a change in the mass on the basis of the first parameter and a second parameter representing a reference mass of the fan impeller.

14. The apparatus of claim 13, wherein the frequency converter is configured to supply power to a fan motor of a fan, which fan motor will rotate the fan impeller.

15. The apparatus of claim 14, in combination with a fan having a fan impeller, wherein torque applied to the fan impeller will cause a change in angular speed of the fan impeller.

16. The apparatus of claim 15, wherein the frequency converter estimates the angular speed on the basis of fan motor currents.

17. The apparatus of claim 16, wherein the estimator is configured for determining a change in angular speed of the fan impeller induced by the torque by using angular speed information provided by the frequency converter, and for calculating a value for a first parameter representing a present mass of the fan impeller on the basis of a change in the angular speed of the fan impeller and the torque.

18. The apparatus of claim 17, wherein the watchdog comprising:
- a comparator, for comparing a difference between the first parameter and the second parameter to a third parameter representing a maximum allowable change in mass.

19. An apparatus for determining a change in a mass of a fan impeller, comprising:
- means for inducing a torque to the fan impeller on the basis of a set torque reference pattern;
- means for determining a change in the angular speed of the fan impeller, induced by the torque;
- means for determining, on the basis of the change in the angular speed and the torque, a value for a first parameter representing a present mass of the fan impeller; and
- means for determining a change in mass on the basis of the first parameter and a second parameter representing a reference mass of the fan impeller.

20. The apparatus of claim 19, wherein the apparatus is a frequency converter.

* * * * *